(12) United States Patent
Aronson et al.

(10) Patent No.: US 8,041,210 B2
(45) Date of Patent: Oct. 18, 2011

(54) PARALLEL HIGH-SPEED COMMUNICATION LINKS WITH REDUNDANT CHANNEL ARCHITECTURES

(75) Inventors: Lewis B. Aronson, Los Altos, CA (US);
Darin J. Douma, Monrovia, CA (US);
Christopher R. Cole, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 881 days.

(21) Appl. No.: 11/952,832

(22) Filed: Dec. 7, 2007

(65) Prior Publication Data

US 2009/0060522 A1    Mar. 5, 2009

Related U.S. Application Data

(60) Provisional application No. 60/915,088, filed on Apr. 30, 2007.

(51) Int. Cl.
*G02F 1/00* (2006.01)

(52) U.S. Cl. ............ 398/5; 398/3; 398/22; 398/23; 398/24; 398/141; 398/45; 398/47; 398/7; 398/8; 385/88; 385/89; 385/90; 385/92; 385/93

(58) Field of Classification Search .......... 398/3, 5, 398/10, 17, 12, 19, 2, 22, 23, 24, 140, 141, 398/135, 136, 137, 138, 139, 182, 183, 202, 398/208, 209, 45.47, 48, 46, 158, 159, 1, 398/4, 7, 8, 33, 38, 79; 385/88, 89, 90, 92, 385/93

See application file for complete search history.

(56) References Cited

U.S. PATENT DOCUMENTS

| 5,677,917 | A | 10/1997 | Wheelus et al. |
| 6,989,945 | B2 | 1/2006 | Kang et al. |
| 2003/0011851 | A1 | 1/2003 | Trezza |
| 2006/0104646 | A1* | 5/2006 | Schrodinger ............ 398/192 |
| 2008/0273880 | A1* | 11/2008 | Wang et al. ............ 398/139 |

OTHER PUBLICATIONS

Small Pitch Flip-Bonded 850 nm 2-D VCSEL Arrays with Redundant Pixel Designs for Optical Datacom, Hendrick Roscher, Annual Report 2004, Optoelectronics Department, University of Ulm.
Zarlink's Innovative ZLynx Cable Products Simplify Data Center and Computer Cluster Interconnects (2 pages) http://news.zarlink.com/archive/2007/Feb/21/Feb21-SmartCable.htm.en.
Zarlink Parallel Solutions (1 page) http://www.zarlink.com/opticalsolutions/parallelsolutions.htm, 2007.

\* cited by examiner

*Primary Examiner* — Hanh Phan
(74) *Attorney, Agent, or Firm* — Maschoff Gilmore & Israelsen

(57) ABSTRACT

An optical transmission system includes more optical channels than electrical channels. If an optical channel is not functioning, the signals may be diverted to another optical channel since there are more optical channels than electrical channels. Embodiments of the present invention also relate to switches for switching the electrical channels to particular optical channels on either or both of the transmission and reception side. The switches include switching elements and selector elements for routing the electrical signals between the electrical channels and optical channels. In one embodiment, the multiple optical channels are incorporated into a single cable. The single cable may have the electrical interface for a number of electrical channels exposed for mechanical and electrical coupling with an external port, whereas the optical channels may be hidden within the cable coating.

21 Claims, 6 Drawing Sheets

PARALLEL HIGH-SPEED COMMUNICATION LINKS WITH REDUNDANT CHANNEL ARCHITECTURES

CROSS-REFERENCE TO RELATED APPLICATIONS

Not applicable.

BACKGROUND

Many high speed data transmission networks rely on optical links to communicate digital data. For each direction of such an optical link, the link includes an optical transmitter (such as a laser), an optical fiber, and an optical receiver (such as a photodiode). The optical transmitter converts outgoing electrical data signals into outgoing optical data signals. The optical receiver converts incoming optical data signals into incoming electrical signals. Optical transmitters are also sometimes called "optical sources" and optical receivers are also sometimes called "optical detectors".

Optical transmitters and receivers are often manufactured on a semiconductor substrate using semiconductor processing technology, which uses a recipe of processing steps to create an appropriate structure having very fine feature dimension sizes. Processing technology results in some imperfections. Sometimes, such imperfections may result in a dysfunctional or unreliable structure. The ratio of successfully fabricated structures to the total number of structures attempted is often termed "yield". All things being equal, higher yields are more desirable. However, higher yields often require undesired tradeoffs with performance or operating conditions or at the least more design or process development which can take a great deal of time and expense. Thus, the most commercially viable yield is often less than the maximum possible yield.

As an example, suppose that the structure being manufactured is an optical transmitter in the form of a laser, and that nine out of ten of such structures are manufactured successfully. The laser could then be said to have a yield of 90 percent, which may very well be an acceptable yield for many applications.

Sometimes, however, it is desirable to have an array of optical transmitters as a final integrated product. For instance, suppose that one desires a cable with 10 separate bi-directional optical links. It might be helpful to have a single integrated die with 10 optical transmitters built thereon. Such an array might be more compact, and be more convenient to align. However, the yield of the overall die can plummet in such an arrangement. For instance, if a successful structure relies on 10 working optical transmitters, and each optical transmitter can be manufactured with a 90 percent yield, the yield of the entire array would be much smaller, even as low as 0.9 to the power of 10 (expressed sometimes as $0.9^{10}$, which is about 35%) in situations in which the yield of one optical transmitter was independent of another. This yield can be improved by tightening operating conditions or relaxing specifications, but this may be unacceptable or undesirable for the intended application.

What may be even more problematic than poor initial yield is poor device reliability. Unacceptable reliability is a common problem with semiconductor lasers. Such problems can typically be divided into those with high initial rates (often termed "infant mortality"), and those with much longer mean times to failures but which still result in unacceptable long term reliability. Once identified and characterized, infant mortality failures are typically screened out by operating the device (at the wafer, die, optical subassembly or final transmitter or transceiver module level), for a predetermined period of time, and usually at an elevated operating temperature and/or current density.

Failure modes with much longer mean times to failure can be avoided by testing representative device lots, usually over a range of elevated temperatures and current densities to confidently predict acceptably low failure rates over specified operating conditions or to drive design changes to achieve these failure rates.

As with initial failures, reliability problems can be greatly exacerbated in arrays of devices, and such problems have continued to be a major design and cost issue in parallel optical links.

One solution to improve optoelectronic array device reliability is the use of a multiplicity of optical sources all coupled to the same optical channel. This may be done at good coupling efficiencies if the optical channel has greater modal volume (e.g., supports a larger number of electromagnetic modes) than the combined modal volume of the sources. This is often the case with common VCSEL dimensions and multimode optical fiber designs. In this solution, a single source is used to transmit a desired signal. However, if a failure or degradation of this source is detected, a different source of the subarray is coupled to the same optical channel.

There are several drawbacks to the above-mentioned technique. For instance, the number of sources is the product of the array size and the number of devices in the subarray (4 per channel in the prior art). Such a large number of sources uses a much larger number of connections to the array of driving circuits. This might be only practical with the use of direct connection (e.g. flip chip binding) of the optoelectronic array to the driver array wafer. Additionally the smaller devices needed may have lower yields or reduced reliability compared to the larger single device it replaces. Finally, many yield and reliability problems are due to local material defect densities and result in much less improvement in overall yield of a small group of devices relative to single devices than would be expected in independent failure mechanisms.

BRIEF SUMMARY

Although not required, embodiments of the present invention relate to an optical transmission system that includes more optical channels than electrical channels. If an optical channel is determined to have failed or to have degraded in a manner which predicts a failure, the signals may be diverted to another optical channel since there are more optical channels than electrical channels. Embodiments of the present invention also relate to switches for switching the electrical channels to particular optical channels on either or both of the transmission and reception side.

In one embodiment, the multiple optical channels are incorporated into a single cable. The single cable may have a number of electrical channels exposed, whereas the optical channels may be hidden within the cable coating. In this embodiment, often referred to as "active cable", the use of different transmitters, optical channels, or receivers is not visible to the host systems, and in principle the details of such a system need not be part of the external specifications of the cable. Advantageously, this enables embodiments of the present invention to be used in standardized electrical to electrical links but with improved yield (and therefore cost) and reliability relative to existing implementations of these links.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION OF THE PREFERRED EMBODIMENTS

Figure 1:
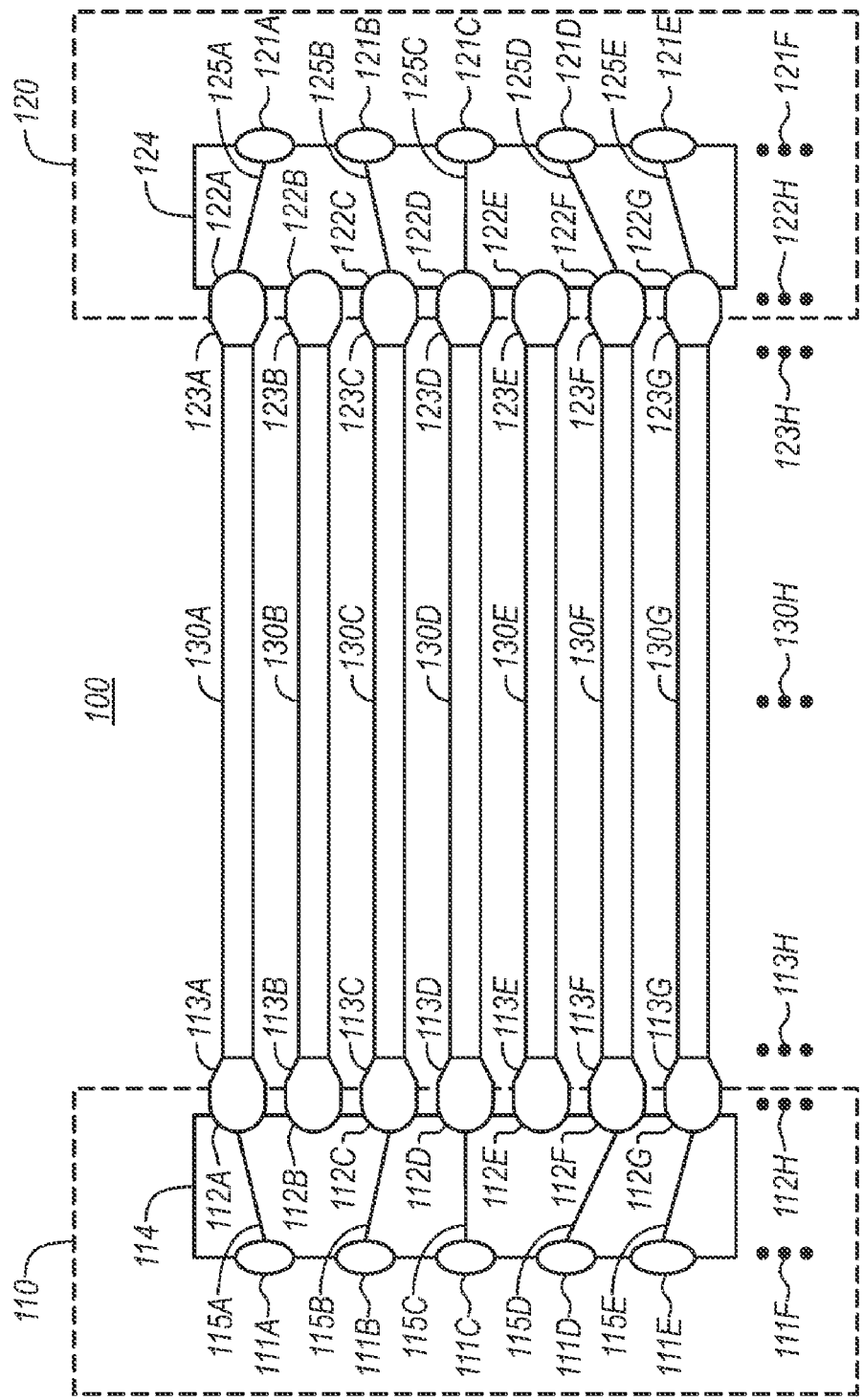
FIG. 1 abstractly illustrates an assembly in which an array of electrical channels are supported by an array of optical channels where there are more optical channels than electrical channels.

Embodiments of the present invention relate to a high-speed communication array system having redundant channels. The channels can be electrical and/or optical and can be unidirectional or bidirectional. For instance, a unidirectional optical channel consists of an optical transmitter or source, an optical receiver or detector, and an optical medium (such as, for example, an optical fiber) coupled between the optical transmitter and the optical receiver. The optical transmitter transmits an optical signal through the optical medium whereupon the optical signal is received by the optical receiver. A bidirectional optical channel consists of two unidirectional optical channels, one for each direction of communication between the two endpoints of the optical channel.

In optical communication array systems, multiple optical transmitters and/or multiple optical receivers for multiple optical channels are typically fabricated on a single integrated die. Additionally, driver circuits for the transmitters and/or receiver circuits (e.g., post amplifiers/trans-impedance amplifiers) for the receivers are each typically fabricated as a single integrated circuit. For instance, in an "n" (where "n" is a positive integer) unidirectional channel optical communication array system, "n" optical transmitters and "n" optical receivers may each be constructed on single array dies, and "n" driver circuits and "n" receiver circuits may each be fabricated as single integrated circuits. The array of driver circuits would be coupled to the array of transmitters and the array of receivers to the array of receiver circuits. One end of "n" optical fibers may be coupled to the "n" optical transmitters and the other end to the "n" optical receivers to form an "n" channel unidirectional optical channel array.

In an "n" bidirectional channel optical communication array system, "n" optical transmitters and "n" optical receivers may be constructed as in the unidirectional link described above, with the array of transmitters on one die and the array of receivers on another die. The driver electronics can be fabricated as one integrated circuit while the receiver electronics are fabricated as another integrated circuit. Alternately or additionally, the driver and receiver electronics may be integrated together on the same integrated circuit. One end of two times "n" (i.e., 2×n) optical fibers may be coupled to the "n" optical transmitters and the "n" optical receivers to form one end of an "n" channel bidirectional optical channel array. Thus, "n" functional bidirectional optical channels may support up to "n" bidirectional electrical channels.

In operation, electrical signals representing data to be communicated may be supplied to each of the "n" optical transmitters. Each of the "n" electrical signals is converted to an optical signal and transmitted by the corresponding optical transmitter onto the corresponding optical medium. At the other end of each of the "n" optical channels is an optical receiver, which receives the optical signal and converts the optical signal into an electrical signal.

An electrical connector may be specifically designed to facilitate either "n" unidirectional electrical channels (in which case two connectors are needed at each end to support a bidirectional system), or "n" bi-directional electrical channels. In both cases, if any of the optical channels is not working, one or more of the "n" electrical channels is not supported. Since the operation of the array communications system relies on the functionality of all "n" optical channels in the case of a unidirectional system and "2n" optical channels in the case of a bidirectional system, the entire array may lose functionality with the loss of one optical channel. Accordingly, if there is a faulty optical transmitter or optical receiver that is the cause of the faulty optical channel, the entire array communications system is considered faulty.

In accordance with the principles of the present invention, however, a multiple optical channel array is provided in which there are more optical channels than electrical channels. Accordingly, even if one or perhaps more of the optical channels is faulty, the electrical channels may still be supported by the remaining functional optical channels so long as there are enough remaining functional optical channels. On the transmit side, a switch is provided to connect the electrical transmit signals to a corresponding optical transmitter corresponding to a functioning optical channel. On the receive side, a switch connects the appropriate optical receiver to the appropriate electrical receiver. From the electrical perspective, an electrical signal was transmitted and received, even though there may be some optical channels that are not functioning.

The principles of the present invention are not limited to the number of electrical channels, nor the number of optical channels, so long as there are more optical channels than electrical channels. Nevertheless, to illustrate the broader principles of the present invention, a specific example embodiment is illustrated with respect to FIG. 1, which schematically illustrates optical communication array system 100. The optical communication system 100 includes five electrical channels, but seven optical channels. In this example, up to two optical channels may be faulty while still allowing full functionality of the five electrical channels. As a preliminary note, the optical communication system 100 is not drawn to scale. Furthermore, some components are illustrated abstractly and are not necessarily the shape that is illustrated. Additionally, all of the optical and electrical channels of FIG. 1 are described as being unidirectional, with information flowing from left to right. However, the principles of the present invention just as easily apply to optical communication array systems in which one or more or all of the electrical and optical channels are bidirectional.

The optical communication array system 100 includes optical transmission array integrated circuitry 110. In this example, the transmission array integrated circuitry 110 is fabricated with five electrical transmission electrical input ports 111A through 111E to support five separate electrical channels. However, there may be more or less than five electrical transmission input ports as represented by the vertical ellipsis 111F to thereby support more or less than five electrical channels. Hereinafter, the electrical transmission input ports 111A through 111E may also be referred to collectively as "electrical transmission input ports 111".

The transmission array circuitry 110 also includes a number of transmission electrical output ports 112A to 112G, hereinafter also referred to collectively as "transmission electrical output ports 112". In this case, there are seven electrical output ports 112, one for each of the seven possible optical channels. However, once again, if there were more or less than seven possible optical channels, there would be the same number of transmission electrical output ports as represented by the vertical ellipsis 112H.

In the illustrated case, there are two redundant optical channels since there are only five optical channels that are needed to support the five electrical channels. However, the principles of the present invention apply regardless of whether there is just one, or whether there are more than two redundant optical channels. In any case, the number of transmission electrical output ports of the transmission array integrated circuit 110 is greater than the number of transmission electrical input ports. Accordingly, not all of the optical channels will be used.

The electrical transmission input ports 111 are provided to a transmission switch 114, which selectively electrically couples each of transmission electrical input ports 111 to a corresponding transmission electrical output port. For instance, as an example, electrical input port 111A is shown electrically coupled to electrical output port 112A as represented symbolically by line 115A. Electrical input port 111B is shown electrically coupled to electrical output port 112C as symbolically represented by line 115B. Electrical input port 111C is shown electrically coupled to electrical output port 112D as symbolically represented by line 115C. Electrical input port 111D is shown electrically coupled to electrical output port 112F as symbolically represented by line 115D. Finally, electrical input port 111E is shown electrically coupled to electrical output port 112G as symbolically represented by line 115E. While not shown, driver circuitry can be integrated with the transmission switch 114 in the transmission array circuitry 110.

A wide variety of electrical coupling mechanisms may be used consistent with the principles of the present invention. The precise selection of a coupling mechanism is not critical to the features of the present invention, so long as the coupling does not interfere significantly with signal quality given the frequency of the electrical signals applied to the transmission electrical input ports. The coupling occurs such that during operation, when an electrical signal is applied to the corresponding transmission electrical input port, the electrical signal is also applied to the corresponding transmission electrical output port.

Each of the transmission electrical output ports 112A through 112G is coupled to a corresponding optical transmitter 113A to 113G, respectively. The optical transmitters 113A through 113G may hereinafter be referred to collectively as "optical transmitters 113" and may be integrated in a single die that is coupled to the transmission array circuitry 110. If there are less or more than seven optical channels, than there would be an equivalent number of optical transmitters as represented by the vertical ellipsis 113H. Regardless of the number of optical channels, during operation, when an electrical signal is applied to the corresponding electrical output port, the corresponding optical transmitter transmits a corresponding optical signal each over an optical medium. In the illustrated case, the optical media 130A through 130G (referred to collectively as "optical media 130") correspond to the seven illustrated optical channels, where the vertical ellipsis 130H represents that there may be other numbers of optical media to support other numbers of optical channels. That is, there may be more than or less than seven optical media if there were a different number of optical channels. Note that some of the optical transmitters (in the illustrated case, optical transmitters 113B and 113E) are unused in this example since the number of the electrical output ports is greater than the number of the electrical input ports.

On the receive side, the optical communication array system 100 includes optical receiver array integrated circuitry 120 that is coupled to optical receivers 123A through 123G (sometimes collectively referred to as "optical receivers 123"). In one embodiment, optical receivers 123 can be fabricated on a single die while the receiver array circuitry 120 is fabricated on a separate die. The receiver array circuitry 120 may include a receiver switch 124, two or more electrical input ports 122, and one or more electrical output ports 121. Alternately or additionally, pre-amplifiers and/or post-amplifiers can be integrated into the receiver array circuitry 120 and/or can be provided as one or more separate integrated circuits.

Each of the optical receivers 123A through 123G is coupled to corresponding optical media 130A through 130G. Once again, there may be more than or less than seven optical receivers as represented by the vertical ellipsis 123H if there were more than or less than seven optical channels. During operation, if there is an optical signal present on the corresponding optical media, the corresponding optical receiver receives the optical signal and converts the optical signal into a corresponding electrical signal. An example of an optical receiver may be a photodiode, possibly coupled to a post-amplifier and/or a trans-impedance amplifier as desired. As mentioned above, an array of such amplifiers can be provided as a separate integrated circuit or can be integrated with the switch 124 on the receiver array circuitry 120.

The optical receiver array integrated circuitry 120 also includes receiver electrical input ports 122A through 122G (collectively referred to as "receiver electrical input ports 122"), with other possible numbers of receiver electrical input ports represented by the vertical ellipsis 122H. There is one electrical input port 122 for each optical channel. During operation, when an optical signal is received by the corresponding optical receiver, a corresponding electrical signal is received at the corresponding electrical input port 122.

The optical receiver array integrated circuit 120 also includes electrical output ports 121A through 121E (collectively referred to as "electrical output ports 121"), with other possible number of electrical output ports represented by the vertical ellipsis 121F. There is one electrical output port 121 for each electrical channel.

A receiver switch 124 selectively electrically couples at least one (and in this case, five) of the electrical input ports 122A through 122G to a corresponding one of the output ports 121A through 121E. Accordingly, during operation, when an electrical signal is applied to the corresponding electrical input port, the electrical signal is also generated by the corresponding reception electrical output port. In the illustrated case, the electrical input ports 122B and 122E remain unused since they are not coupled to any of the electrical output ports. In the example, electrical input port 122A is illustrated as electrically connected to the electrical output port 121A as symbolically represented by line 125A. Electrical input port 122C is illustrated as electrically connected to the electrical output port 121B as symbolically represented by line 125B. Electrical input port 122D is illustrated as electrically connected to the electrical output port 121C as symbolically represented by line 125C. Electrical input port 122F is illustrated as electrically connected to the electrical output port 121D as symbolically represented by line 125D. Finally, electrical input port 122G is illustrated as electrically connected to the electrical output port 121E as symbolically represented by line 125E.

Thus, during operation, to formulate one electrical channel, switches 114 and 124 allow an electrical signal applied on transmission electrical input port 111A to communicate with reception electrical output port 121A using the optical channel represented by transmitter 113A, optical medium 130A and optical receiver 123A. To formulate a second electrical channel, an electrical signal applied on transmission electrical input port 111B is allowed to communicate with electrical output port 121B using the optical channel represented by the transmitter 113C, optical medium 130C and optical receiver 123C. To formulate a third electrical channel, an electrical signal applied on transmission electrical input port 111C is allowed to communicate with reception electrical output port 121C using the optical channel represented by the transmitter 113D, optical medium 130D and optical receiver 123D. To formulate a fourth electrical channel, an electrical signal applied on transmission electrical input port 111D is allowed to communicate with reception electrical output port 121D using the optical channel represented by the transmitter 113F, optical medium 130F and optical receiver 123F. Finally, to formulate the fifth electrical channel, an electrical signal applied on transmission electrical input port 111E is allowed to communicate with reception electrical output port 121E using the optical channel represented by the transmitter 113G, optical medium 130G and optical receiver 123G.

Meanwhile, the optical channel represented by optical transmitter 113B, optical medium 130B, and optical receiver 123B would remain unused as directed by switches 114 and 124. Similarly, the optical channel represented by optical transmitter 113E, optical medium 130E, and optical receiver 123E would remain unused as directed by switches 114 and 124. Thus, the switches 114 and 124 control which of the optical channels are used to support the electrical channels, and which optical channels may remain unused.

There are a variety of reasons why the switches would direct the use of one optical channel over another. For instance, one optical channel may have better overall link performance. This performance may be measured in terms of signal amplitude or contributed jitter. In another example, perhaps one or two optical channels are not functional at all. For instance, when manufacturing an array of optical transmitters and/or optical receivers (either of which may be referred to as an "optical element"), it is often the case that one or more of the optical elements may not function at all. In that case, rather than treating the entire array as non-functional, the switches may be used to direct data flow through functional optical channels instead.

In one embodiment, the unused optical channels may vary over time (typically degrading). In that case, the switches 114 and 124 may dynamically change electrical couplings between appropriate electrical input and output ports. However, the unused optical channels may also be static. For instance, in an optoelectronic device array, if an optical transmitter is not operating after fabrication of the array is complete, it is almost certainly never going to work. Accordingly, at the time of manufacture, the switches 114 and 124 may simply never direct data to the non-functional optical transmitter.

Figure 2:
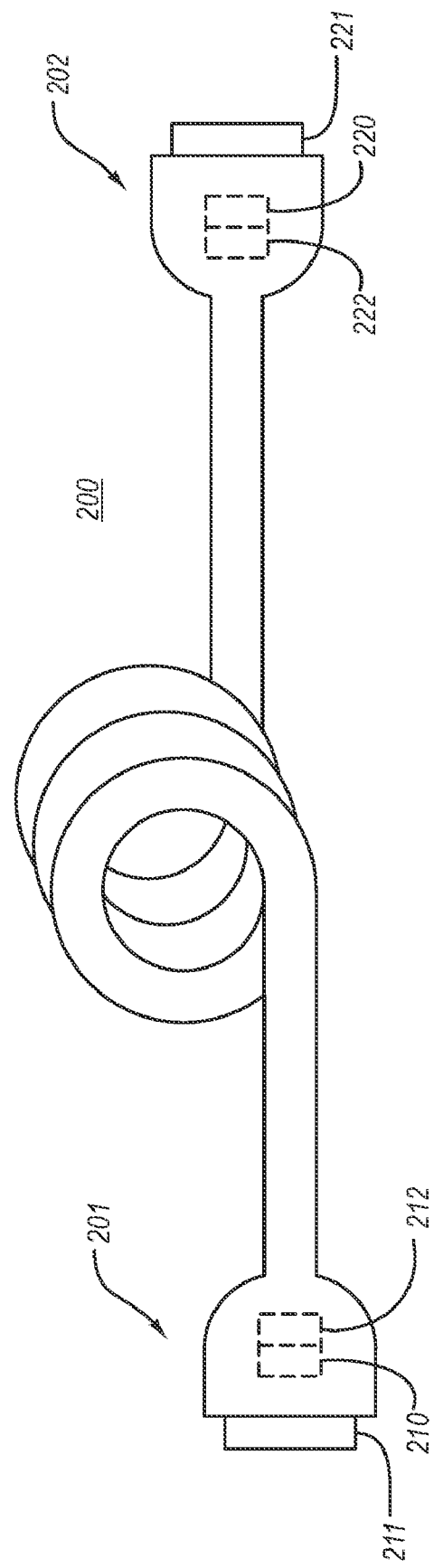
FIG. 2 illustrates an example cable that may include an embodiment of the assembly of FIG. 1.

Of course, FIG. 1 is drawn in a manner that all of the electrical and optical ports are externally accessible. However, it is usually beneficial in practical usage to bundle the optical fibers together in a single cable, along with optoelectronic devices (e.g., transmitters, receivers) and electronics (e.g., transmit switch, receiver switch, drivers, post-amplifiers, pre-amplifiers). For instance, FIG. 2 illustrates an active cable 200 in which transmitter array integrated circuitry 210 and transmitter array 212 are included within the transmit side 201 of the cable 200, and receiver array 222 and receiver array integrated circuitry 220 are included within the reception side 202 of the cable 200. In this embodiment, the transmitter array integrated circuitry 210, transmitter array 212, receiver array 222, and receiver array integrated circuitry 220 correspond to the transmitter array circuitry 110, optical transmitters 113, optical receivers 123, and receiver array circuitry 120 of FIG. 1, respectively.

Returning to FIG. 2, optical channels may be included within the length of the cable 200 itself. If the cable 200 is capable of bi-directional channels, the transmit side 201 may also include reception array integrated circuitry and a receiver array, whereas the reception side 202 may also include transmission array integrated circuitry and a transmitter array. In that case, the transmission and reception array integrated circuits on the transmit side 201 may be integrated within a single integrated circuit. Furthermore, the transmission and reception array integrated circuits on the reception side 202 may be integrated within a single integrated circuit.

The active cable 200 of FIG. 2 is quite unique in that the electrical interface for a number of electrical channels is exposed for mechanical and electrical coupling with an external port, whereas much of the communication over the length of the cable 200 occurs using optical signals. Accordingly, from outward appearances, the cable 200 may appear to be an electrical cable, permitting connections with electrical ports, while taking advantage of the benefits of optical communication over much of its length. Benefits of optical communication include high bandwidth communication with low power consumption, high port density, and less pre-processing and post-processing of information. Further, because the cable 200 is connected externally using electrical connectors at both ends, it does not have to meet any external optical specification, which is a great advantage in achieving low cost. Additionally, the optoelectronics of the cable 200 need not support worst case link configurations since the configuration is determined by the manufacturer, further reducing costs.

An example of an integrated optical cable into which the principles of the present invention may be employed is described in commonly-assigned, co-pending U.S. patent application Ser. No. 11/402,106, filed Apr. 10, 2006, and entitled "Active Optical Cable With Electrical Connector" which patent application is incorporated herein by reference in its entirety.

Figure 3:
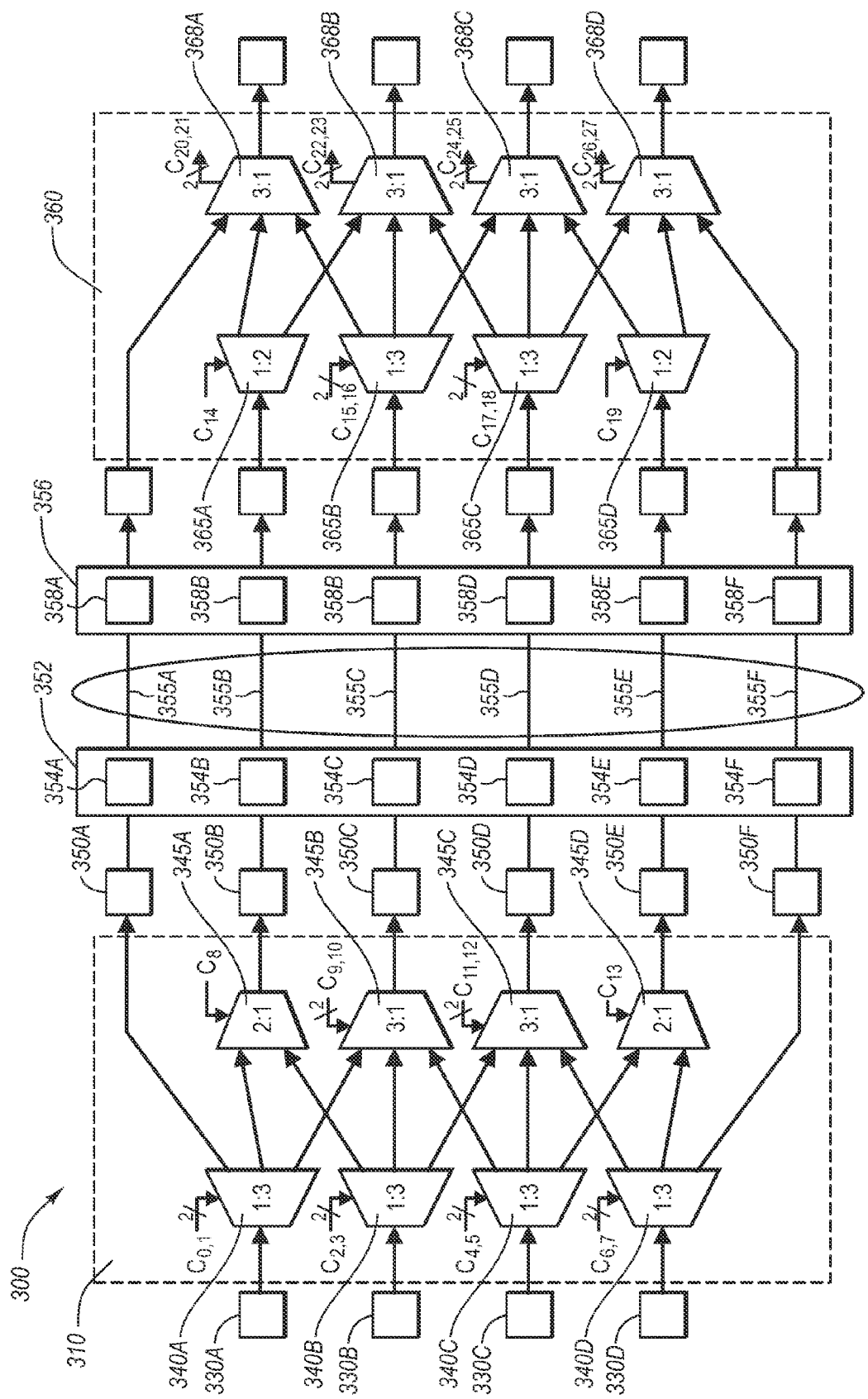
FIG. 3 illustrates a first embodiment of a switching circuit that may be implemented in the assembly of FIG. 1.

Turning attention now to FIG. 3, a unidirectional cable link 300 with individual channel redundancy is illustrated. Similar to FIG. 1, a plurality of electrical channels are supported by a plurality of optical channels, including two redundant optical channels. In this embodiment, however, four electrical channels are supported by six optical channels, rather than supporting five electrical channels with seven optical channels.

While specific numbers for electrical and optical channels are provided herein by way of example, one skilled in the art will appreciate that virtually any number of electrical channels and optical channels can be implemented according to embodiments of the invention.

Returning to FIG. 3, one embodiment of a transmission switching circuit 310 is illustrated which may correspond to the transmission switch 114 of FIG. 1. Similarly shown is an embodiment of receiver switching circuit 360 which may correspond to the receiver switch 124 of FIG. 1. The arrows indicate the direction that electrical signals flow in these circuits. However, the principles of the present invention may also apply to circuits which are bidirectional, either through the integration of blocks 310 and 360, or through the routing of bidirectional signals at a lower level, along with another set of optical transmission means in the opposite sequence.

On the transmit side of the link 300, there are four electrical input ports 330A through 330D to support four separate electrical channels. However, there may be more or less than four electrical input ports to support more or less than four separate electrical channels. The electrical input ports 330A through 330D may correspond to the electrical input ports 111 of FIG. 1. Hereinafter, the electrical input ports 330A through 330D may also be referred to collectively as "electrical input ports 330".

The transmit side of the link 300 also includes a number of electrical output ports 350A to 350F, hereinafter also referred to collectively as "electrical output ports 350". In this case, there are six electrical output ports 350, one for each of six possible optical channels 355A through 355F (also referred to collectively as "optical channels 355"). However, once again, there may be more or less than six electrical output ports 350 when there are more or less than six optical channels 355. The electrical output ports 350 may correspond to the electrical output ports 112 of FIG. 1.

Six optical transmitters 354A through 354F (also referred to collectively as "optical transmitters 354") are coupled to the electrical output ports 350 for emitting optical signals onto the optical channels 355. There may be more or less than six optical transmitters when there are more or less than six optical channels 355. As shown, the optical transmitters are fabricated on a single die 352 as an array of optical transmitters.

In the example of FIG. 3, the transmission switch 310 is implemented using a column of 1:3 switch elements 340A through 340D (also referred to herein as "switch elements 340") followed by a column of 2:1 and 3:1 selector elements 345A through 345D (also referred to herein as "selector elements 345"). In general, if the number of input channels is N and the redundancy number is R (e.g., the number of extra optical channels is R), then the first column will consist of N 1:(R+1) switch elements 340 and the second column will consist of a set of (N+R−2) selector elements 345 ranging in size from 1:2 to 1:MIN(N,R+1).

An important characteristic of the transmission switch 310 is that the complexity, and thus the circuit area (and in some cases the power dissipation) are much less than that of a full crossbar switch which can arbitrarily connect any electrical input channel to any optical channel. Such a full crossbar switch would require N 1:(N+R) switch elements and (N+R) 1:N selectors. Since the circuit complexity is roughly proportional to the number of inputs/outputs of these switch elements, in the example in FIG. 3, a full crossbar switch would require at least 3 times the transistor count as the implementation shown. However, the switch 310 can be simplified and implemented as shown due to the fact that there is no preference for which of the chosen optical channels is used for which input channel and thus a small subset of all possible arrangements may be used.

In the embodiment of FIG. 3, the states of the various elements 340, 345 in the transmission switch 310 are selected by a set of 14 control lines, shown as $C_0$ through $C_{13}$. For example, the 3 possible states of the switch element 340A may be set by control bits $C_0$ and $C_1$ having values of [0,0], [0,1] or [1,0]. In some embodiments of the invention (see FIGS. 4A, 4B), this control information can be retained in some type of nonvolatile storage. As shown, 14 bits can be used to control the overall state of the transmission switch 310. However, only a subset of each element's states are required and the actual number of bits of storage required to control the overall state of the transmission switch 310 is less than 14 bits. In the specific example shown in FIG. 3, there are only 15 overall states of interest, which may be stored with only 4 control bits and demultiplexed into the required control settings $C_0$-$C_{13}$.

On the transmit side of the link 300, optical signals emitted by the optical transmitters 354 are received by optical receivers 358A through 358F (also referred to collectively as "optical receivers 358"). While six optical receivers 358 are shown, there may be more or less than six receivers 358 when there are more or less than six optical channels 355. In the embodiment of FIG. 3, the optical receivers 358 are fabricated on a single die 356 as an array of optical receivers.

Similar to the transmit side of the link 300, the receive side of the link 300 includes a plurality of electrical input ports and a plurality of electrical output ports. There are more electrical input ports than electrical output ports to support redundant optical channels. Further, the selective coupling of the electrical input ports to the electrical output ports is controlled by the receiver switch 360.

The details of the receiver switch 360 are similar to the details of the transmission switch 310. In particular, the receiver switch 360 includes a column of switching elements 365A through 365D (also referred to herein as "switching elements 365") and a column of selector elements 368A through 368D (also referred to herein as "selector elements 368"). In general, if the number of input channels is N and the redundancy number is R, then the first column will consist of a set of (N+R−2) switch elements 365 ranging in size from 1:2 to 1:MIN(N,R+1) and the second column will consist of N 1:(R+1) selector elements 368. The states of the various elements 365, 368 in the receiver switch 360 are also selected by a set of 14 control lines, shown as $C_{14}$ through $C_{27}$. As with the transmission switch 310, the receiver switch 360 has 15 overall states of interest which may be stored with only 4 controls bits and demultiplexed into the required control settings $C_{14}$-$C_{27}$.

One skilled in the art will appreciate that while 4 bits of storage are also required for the receiver switch 360, those settings are completely determined by the settings of the transmission switch. Accordingly, in one embodiment a low speed control path can be provided between the two ends of the unidirectional cable link 300, enabling storage of the 4 control bits in non-volatile storage at only one end of the link 300. Alternately or additionally, non-volatile storage can be provided at both ends of the link 300 for storage of control bits if there is no low speed control path between the two ends. Alternately or additionally, the state of the reception switch 360 may be determined by the presence or absence of signal on each of the optical channels 355 and eliminate the need for storage of the switch state at that end.

Figure 4A:
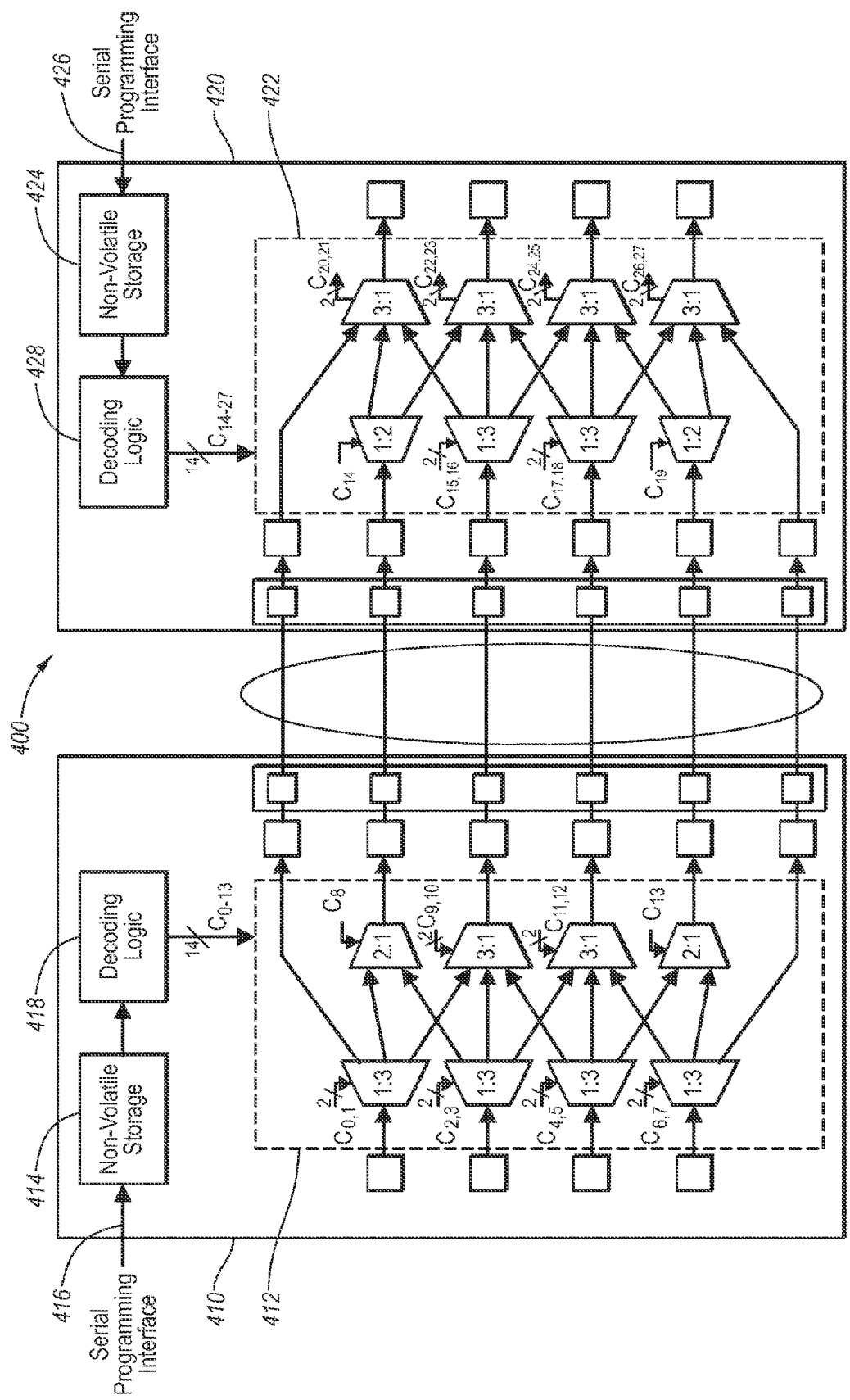
FIG. 4A illustrates control of switching circuit state via non-volatile storage, according to one embodiment of the invention.

With reference now to FIG. 4A, one embodiment of a unidirectional communication link 400 is illustrated in which non-volatile storage is used for the storage of control bits that control the state of a transmission switch 412 and/or a receiver switch 422. Whereas the configuration of the link 400 is similar to the configuration of the link 300 of FIG. 3, it is not necessary to explain the configuration of the link 400 in detail, as reference may be made to the discussion of FIG. 3 above. Additionally, although the invention is described in the context of unidirectional link 400, it may also be applied in a bidirectional link.

In the embodiment of FIG. 4A, means are provided for controlling the state of the transmission switch 412 and the receiver switch 422. In particular, non-volatile storage 414, 424 is provided for storing control bits on the transmit and receive ends 410, 420 of the link 400. The non-volatile storage 414, 424 may comprise, e.g., EEPROM, FLASH, fusible links, and the like or any combination thereof. In the present embodiment, a serial programming interface 416, 426 (such as $I^2C$, MDIO, SPI, and the like) enables programming of the control information into the storage 414, 424.

In operation, control information is programmed into non-volatile storage 414, 424 via serial programming interface 416, 426. As mentioned previously, the state of the transmission switch 412 and/or reception switch 422 can be controlled with 4 control bits. Accordingly, the amount of storage required can be minimized with the configuration of FIG. 4. In any event, control bits are provided to decoding logic 418, 428 which outputs control signals $C_0$-$C_{13}$, $C_{14}$-$C_{27}$ to appropriately configure the states of the switches 412, 422.

Figure 4B:
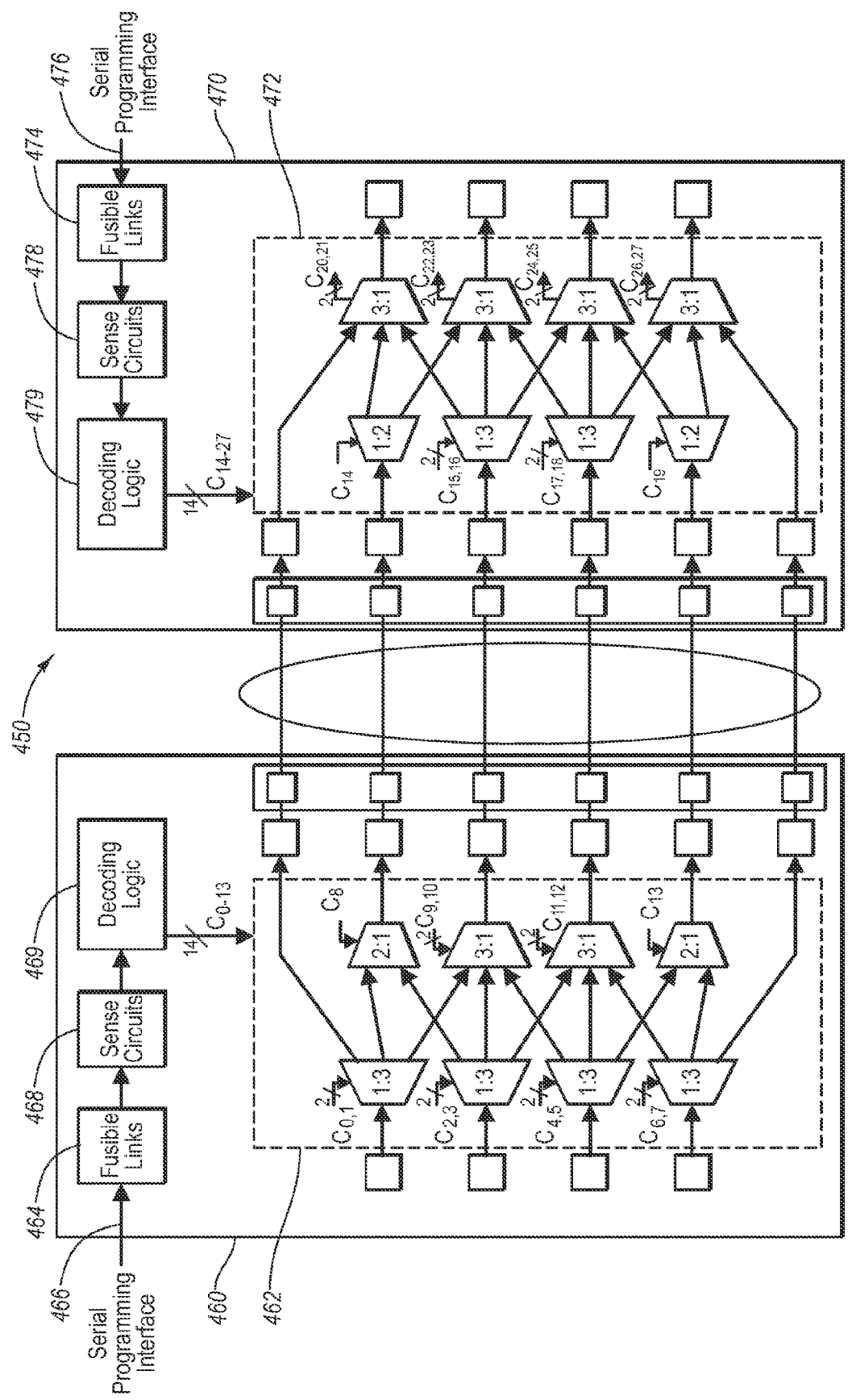
FIG. 4B illustrates the use of fusible links to control the state of switching circuits implemented in embodiments of the invention.

With reference now to FIG. 4B, one embodiment of a unidirectional link 450 is illustrated in which fusible links are used for the storage of control bits that control the state of a transmission switch 462 and/or a receiver switch 472. The link 450 may correspond, for instance, to the link 300 of FIG. 3 and/or the link 400 of FIG. 4A. Details regarding the configuration and operation of the link 460 are similar to the configuration and operation of the link 300.

In the embodiment of FIG. 4B, means are provided for controlling the state of the transmission switch 462 and the receiver switch 472. In particular, one or more fusible links 464, 474 are provided for storing control information on the transmit and receive ends 460, 470 of the link 450. The fusible links 464, 474 may be fuse-type or anti-fuse type fusible links, laser-severable or electrically programmable, or the like, without limitation. The use of fusible links for storing information is well-known in the art and will not be explained in detail here to avoid unnecessarily obscuring the invention.

A serial programming interface 466, 476 is provided to enable programming of the fusible links with control information. Sensing circuits 468, 478 sense the states of the fusible links 464, which are indicative of the control information stored by the fusible links. The sensed control information is then decoded by decoding logic 469, 479 which outputs controls signals to appropriately configure the states of the switches 462, 472.

In the embodiment of FIG. 4B, the use of fusible links rather than EEPROM, FLASH, or other non-volatile storage can be advantageous in many respects. For instance, fusible links are easily integrated with high speed circuitry from a manufacturing standpoint. In contrast, it can be difficult to integrate EEPROM and FLASH into the same die as the high speed circuitry used in embodiments of the invention, requiring the use of a separate integrated circuit. Accordingly, the use of fusible links to control the states of transmission switches and/or reception switches reduces the amount of board space required for storing control information.

Figure 5:
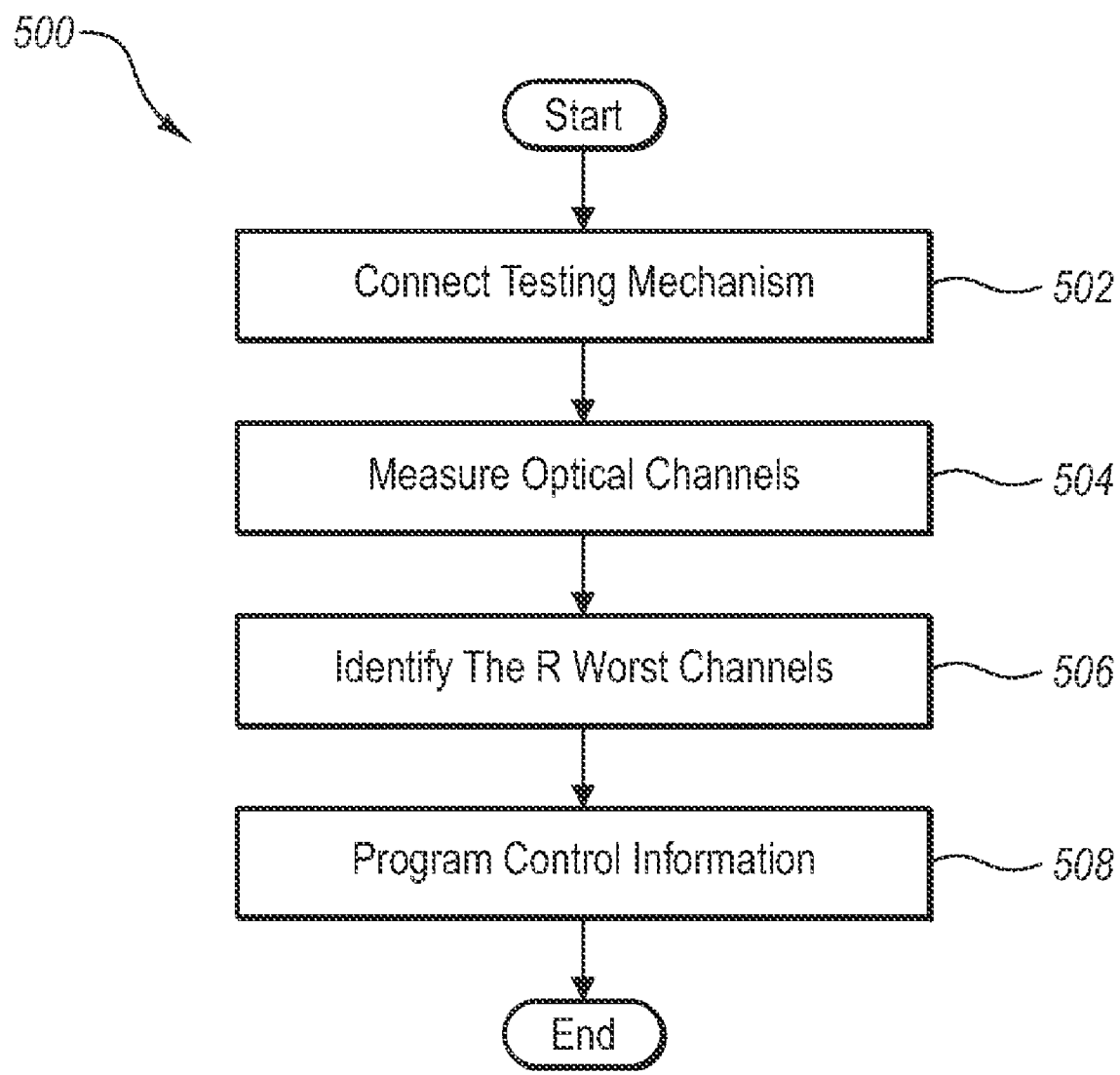
FIG. 5 illustrates one embodiment of a method for programming a switching circuit.

Referring now to FIG. 5, a method 500 for programming a unidirectional communication link is described. The method 500 begins after the communication link has been manufactured, the communication link supporting redundant optical channels by having redundant optoelectronic components. The number of redundant optical channels supported by any given communication link may be represented by the variable R.

The communication link is connected 502 to a testing mechanism for testing the optoelectronic components, whether they be optical transmitters, optical receivers, or both. The testing mechanism may comprise, e.g., an optical bit error rate tester, or the like, and can be used on each end of the communication link individually, and/or on individual channels of the communication link.

The testing mechanism measures 504 each of the communication channels in the communication link. The measurements taken at each end of the communication link and/or for each channel can include, e.g., transmitter bias current, receiver bias current, signal amplitude, contributed jitter, bit error rate, and the like or any combination thereof. The measurements can then be used to identify 506 the R worst channels, such as the R channels with the worst link budget, or R channels that do not function at all, and the like or any combination thereof.

After identifying the R worst channels, they may be excluded from future operation by appropriately programming 508 control information into the communication link. For instance, control information can be stored in fusible links or other nonvolatile storage. As already discussed, fusible links may be laser-programmable, electrically programmable or use some other means for programming. In this manner, the worst channels in a communication link having redundant channels can be switched out, advantageously increasing the yield of the optoelectronic components.

To this point, the invention has been discussed in the context of increasing yield using redundant optical channels. However, the invention may also be implemented using redundant electrical channels. In particular, the methods described herein may be used to solve yield issues in electrical links which use electrical signaling over copper media. To date, the yield of such individual channels may have been adequate to avoid the needs for this type of solution. However as channel speeds increase to 10 Gb/s or beyond, new yield issues may appear.

As an example, the delay skew between elements in a copper differential pair in typical high speed copper cables is known to be a significant performance issue at rates of 10 Gb/s and beyond and is particularly more difficult to overcome than other copper link impairments such as overall pair bandwidth reduction or non-uniformity. Thus, cables using higher and higher numbers of copper transmission channels may greatly reduce the yield, and thus increase the cost, of the cables relative to single channel links.

Such per channel initial yield problems may be emendable to many of the solutions described herein. For instance, a multi-channel copper cable can be manufactured with a small number of extra/redundant cable channels combined with matrix switching circuitry to enable switching out of faulty channels and otherwise implementing the algorithms described herein. Alternately or additionally, the algorithms described herein may be implemented in wireless applications where N+R relatively less reliable channels are used to communicate N effective channels of information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmission comprising:
  a first plurality of electrical input ports;
  a second plurality of electrical output ports, the number of the second plurality of electrical output ports being greater than the number of the first plurality of electrical input ports;
  a third plurality of optical transmitters, each corresponding to one of the electrical output ports such that during operation, when an electrical signal is applied to the corresponding electrical output port, the corresponding optical transmitter transmits a corresponding optical signal; and
  a switch configured to selectively couple a set of the first plurality of electrical input ports to a set of the second plurality of electrical output ports, wherein at least one of the second plurality of electrical output ports comprises a redundant electrical outlet port which can be excluded from the coupled set,
  wherein the switch comprises a plurality of switching circuits and at least one selector circuit, and wherein the switch comprises N 1:(R+1) switching circuits and (N+R−2) selector circuits, wherein N comprises the number of electrical input ports and R comprises the number of the at least one redundant electrical outlet port which can be excluded from the coupled set.

2. The optical transmission array according to claim 1, wherein the number of the second plurality of electrical output ports is one greater than the number of the first plurality of electrical input ports.

3. The optical transmission array according to claim 1, wherein the number of the second plurality of electrical output ports is at least two greater than the number of the first plurality of electrical input ports, such that at least two of the second plurality of electrical output ports can be excluded from the coupled set.

4. The optical transmission array according to claim 1, further comprising a fourth plurality of driver circuits, each corresponding to one of the second plurality of electrical output ports.

5. The optical transmission array according to claim 4, wherein the switch and the fourth plurality of driver circuits are integrated on a single die.

6. An optical receiver array comprising:
  a first plurality of electrical input ports;
  a second plurality of electrical output ports, the number of the first plurality of electrical input ports being greater than the number of the second plurality of electrical output ports;
  a third plurality of optical receivers, each corresponding to one of the electrical input ports such that during operation, when an optical signal is received by the corresponding optical receiver, a corresponding electrical signal is received at the corresponding electrical input port; and
  a switch configured to selectively couple a set of the first plurality of electrical input ports to a set of the second plurality of electrical output ports, wherein at least one of the first plurality of electrical input ports comprises a redundant electrical outlet port which can be excluded from the coupled set,
  wherein the switch comprises a plurality of switching circuits and at least one selector circuit, and wherein the switch comprises N 1:(R+1) selector circuits and (N+R−2) switching circuits, wherein N comprises the number of electrical input ports and R comprises the number of the at least one redundant electrical outlet port which can be excluded from the coupled set.

7. The optical receiver array according to claim 6 wherein the number of the first plurality of electrical input ports is one greater than the number of the second plurality of electrical output ports.

8. The optical receiver array according to claim 6, wherein the number of the first plurality of electrical input ports is at least two greater than the number of the second plurality of electrical output ports such that at least two of the first plurality of electrical input ports can be excluded from the coupled set.

9. The optical receiver array according to claim 6, further comprising a fourth plurality of receiver circuits, each corresponding to one of the first plurality of electrical input ports.

10. The optical receiver array according to claim 9, wherein the switch and the fourth plurality of receiver circuits are integrated on a single die.

11. An optical communication link comprising:
  an optical transmission array comprising a plurality of optical sources and configured to receive a first plurality of data-carrying electrical signals for transmission as a first plurality of data-carrying optical signals, the number of the first plurality of data-carrying electrical signals being equal to the number of the first plurality of data-carrying optical signals and being less than the number of the plurality of optical sources;
  an optical receiver array comprising a plurality of optical detectors and configured to receive the first plurality of data-carrying optical signals and generate therefrom a second plurality of data-carrying electrical signals, the number of the first plurality of data-carrying optical signals being equal to the number of the second plurality of data-carrying electrical signals and less than the number of the plurality of optical detectors; and
  a plurality of optical channels, each coupled between one of the plurality of optical sources and a corresponding one of the plurality of optical detectors, wherein the number of the plurality of optical sources is equal to the number of the plurality of optical detectors,
  wherein the optical transmission array further comprises:
    a plurality of transmission electrical input ports for receiving the first plurality of data-carrying electrical signals, the number of the plurality of transmission electrical input ports being equal to the number of the first plurality of data-carrying electrical signals;
    a plurality of transmission electrical output ports, each corresponding to one of the plurality of optical sources such that during operation, when an electrical signal is applied to the corresponding transmission electrical output port, the corresponding optical source emits a corresponding optical signal, the number of the plurality of transmission electrical output ports being greater than the number of the plurality of transmission electrical input ports; and
    a transmission switch configured to selectively couple the plurality of transmission electrical input ports to a set of the plurality of transmission electrical output ports, wherein at least one of the plurality of transmission electrical output ports comprises a redundant transmission electrical outlet port which is excluded from the coupled set,
  wherein the transmission switch comprises a plurality of switching circuits and at least one selector circuit, and wherein the switch comprises N 1:(R+1) switching circuits and (N+R−2) selector circuits, wherein N comprises the number of transmission electrical input ports and R comprises the number of the at least one redundant transmission electrical outlet port which can be excluded from the coupled set.

12. An optical communication link in accordance with claim 11, wherein the optical receiver array further comprises:
a plurality of receiver electrical input ports, each corresponding to one of the optical detectors such that during operation, when an optical signal is received by the corresponding optical detector, a corresponding electrical signal is received at the corresponding receiver electrical input port;
a plurality of receiver electrical output ports, the number of the plurality of receiver electrical output ports being equal to the number of the second plurality of data-carrying electrical signals and being less than the number of the plurality of receiver electrical input ports; and
a receiver switch configured to selectively couple a set of the plurality of receiver electrical input ports to the plurality of receiver electrical output ports, wherein at least one of the plurality of receiver electrical input ports is excluded from the coupled set.

13. An optical communication link in accordance with claim 12, the optical transmission array further comprising a transmission switch configured to selectively divert each of the first plurality of data-carrying electrical signals to a corresponding optical source, wherein at least one of the plurality of optical sources does not receive one of the first plurality of data-carrying electrical signals.

14. An optical communication link in accordance with claim 13, further comprising non-volatile storage for storing control information, wherein the control information is used to control a state of one or more of: the transmission switch and the receiver switch.

15. An optical communication link in accordance with claim 14, wherein the non-volatile storage comprises one or more of: electrically erasable and programmable read only memory, flash memory, and one or more fusible links.

16. An optical communication link in accordance with claim 11, wherein each of the plurality of optical channels is a corresponding optical fiber and wherein each of the optical fibers is included within a single optical cable.

17. An integrated cable with redundant optical channels, comprising:
a first optical transmission array within the integrated cable, wherein the first optical transmission array includes a first plurality of optical transmitters and is configured to receive a first plurality of data-carrying electrical signals for transmission as a first plurality of data-carrying optical signals using a subset of the first plurality of optical transmitters, the number of the first plurality of data-carrying electrical signals being less than the number of the first plurality of optical transmitters and being equal to the number of the first plurality of data-carrying optical signals; and
a first optical receiver array within the integrated cable, wherein the first optical receiver array includes a first plurality of optical receivers and is configured to receive the first plurality of data-carrying optical signals and generate therefrom a second plurality of data-carrying electrical signals using a subset of the first plurality of optical receivers, the number of the second plurality of data-carrying electrical signals being less than the number of the first plurality of optical receivers and being equal to the number of the first plurality of data-carrying electrical signals; and
a first plurality of optical media coupled between the first optical transmission array and the first optical receiver array within the integrated cable and configured to carry the first plurality of data-carrying optical signals from the first optical transmission array to the first optical receiver array, wherein the number of the first plurality of optical media is equal to the number of the first plurality of optical transmitters and to the number of the first plurality of optical receivers,
wherein the first optical transmission array further comprises:
a plurality of electrical input ports, each for receiving a different one of the first plurality of data-carrying electrical signals;
a plurality of electrical output ports, each electrically coupled to a different one of the first plurality of optical transmitters such that during operation, when an electrical signal is applied to the corresponding electrical output port, the corresponding optical transmitter emits a corresponding optical signal, the number of the plurality of electrical output ports being greater than the number of the plurality of electrical input ports and equal to the number of the first plurality of optical transmitters; and
a transmission switch configured to selectively couple, on a one to one basis, each of the plurality of electrical input ports to a different one of the plurality of electrical output ports, wherein at least one of the plurality of electrical output ports comprises a redundant electrical outlet port which is excluded from the set of coupled ports,
wherein the transmission switch comprises a plurality of switching circuits and at least one selector circuit, and wherein the switch comprises N 1:(R+1) switching circuits and (N+R−2) selector circuits, wherein N comprises the number of electrical input ports and R comprises the number of the at least one redundant electrical outlet port which can be excluded from the set of coupled ports.

18. The integrated cable of claim 17, wherein the first optical transmission array further comprises driver circuitry for the plurality of optical transmitters and wherein the driver circuitry and the transmission switch are fabricated in a single integrated circuit.

19. The integrated cable of claim 17, wherein the first optical receiver array comprises:
a plurality of electrical input ports, each electrically coupled to a different one of the first plurality of optical receivers such that during operation, when an optical signal is received by the corresponding optical detector, a corresponding electrical signal is received at the corresponding receiver electrical input port;
a plurality of electrical output ports, the number of the plurality of electrical output ports being equal to the number of the second plurality of data-carrying electrical signals and being less than the number of the plurality of electrical input ports; and
a receiver switch configured to selectively couple, on a one to one basis, each of the plurality of electrical input ports to a different one of the plurality of electrical output ports, wherein at least one of the plurality of electrical input ports is excluded from the set of coupled ports.

20. The integrated cable of claim 19, wherein the first optical receiver array further comprises receiver circuitry for the plurality of optical receivers and wherein the receiver circuitry and the transmission switch are fabricated in a single integrated circuit.

21. The integrated cable of claim 17, further comprising:
a second optical transmission array within the integrated cable, wherein the second optical transmission array includes a second plurality of optical transmitters and is configured to receive a third plurality of data-carrying electrical signals for transmission as a second plurality of data-carrying optical signals using a subset of the second plurality of optical transmitters, the number of the third plurality of data-carrying electrical signals being less than the number of the second plurality of optical transmitters;
a second optical receiver array within the integrated cable, wherein the second optical receiver array includes a second plurality of optical receivers and is configured to receive the second plurality of data-carrying optical signals and to generate therefrom a fourth plurality of data-carrying electrical signals using a subset of the second plurality of optical receivers, the number of the fourth plurality of data-carrying electrical signals being less than the number of the second plurality of optical receivers; and
a second plurality of optical media coupled between the second optical transmission array and the second optical receiver array within the integrated cable and configured to carry the second plurality of data-carrying optical signals from the second optical transmission array to the second optical receiver array, wherein the number of the second plurality of optical media is equal to the number of the second plurality of optical transmitters and to the number of the second plurality of optical receivers;
wherein the first optical transmission array and the second optical receiver array are disposed within a first end of the integrated cable and the second optical transmission array and the first optical receiver array are disposed within a second end of the integrated cable to facilitate bidirectional communication between the first and second end of the integrated cable.

* * * * *